(12) United States Patent
Govindan et al.

(10) Patent No.: US 10,255,113 B2
(45) Date of Patent: Apr. 9, 2019

(54) WORKLOAD INTERFERENCE ESTIMATION AND PERFORMANCE OPTIMIZATION

(71) Applicant: Microsoft Corporation, Redmond, WA (US)

(72) Inventors: Sriram Govindan, State College, PA (US); Jie Liu, Medina, WA (US); Aman Kansal, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/218,985

(22) Filed: Mar. 19, 2014

(65) Prior Publication Data

US 2014/0201741 A1   Jul. 17, 2014

Related U.S. Application Data

(63) Continuation of application No. 12/843,054, filed on Jul. 26, 2010, now Pat. No. 8,707,300.

(51) Int. Cl.
*G06F 9/50* (2006.01)
*G06F 9/52* (2006.01)
*G06F 9/455* (2018.01)

(52) U.S. Cl.
CPC ........ *G06F 9/5083* (2013.01); *G06F 9/45533* (2013.01); *G06F 9/52* (2013.01)

(58) Field of Classification Search
CPC ....... G06F 9/5083; G06F 9/52; G06F 9/45533
See application file for complete search history.

(56) References Cited

U.S. PATENT DOCUMENTS 6,067,412 A   5/2000  Blake et al.
7,412,492 B1  8/2008  Waldspurger
(Continued)

OTHER PUBLICATIONS

Koh, et al., "An Analysis of Performance Interference Effects in Virtual Environments", Retrieved at << http://citeseerx.ist.psu.edu/viewdoc/download?doi=10.1.1.133.8052&rep=rep1&type=pdf >>, In IEEE International Symposium on Performance Analysis of Systems and Software (ISPASS), Apr. 2007, 10 pages.
(Continued)

*Primary Examiner* — Charles E Anya
(74) *Attorney, Agent, or Firm* — Rainier Patents, P.S.

(57) ABSTRACT

Architecture that facilitates the estimation of interference among workloads (e.g., virtual machines) due to sharing of a shared resource (e.g., a shared cache of a computer processor), and optimization of a desired performance objective such as power or energy use in the presence of the interference. Estimation is to the extent of interference by characterizing the nature of shared resource usage and its effect on performance. Performance optimization is accomplished using metrics based on the above estimation, or alternatively, an explicit measurement of the interference effects. Methods are employed to estimate interference on the workload's performance with changes in availability of the shared resource or with combinations of other workloads sharing the same resource and allocating workloads to one or more physical computers or resources to workloads such that a desired performance objective is optimized. The methods can include allocating workloads on demand.

20 Claims, 10 Drawing Sheets

(56) References Cited

U.S. PATENT DOCUMENTS

| | | | | |
|---|---|---|---|---|
| 7,644,148 B2* | 1/2010 | Ranganathan | ............ | G06F 1/206 709/223 |
| 7,644,162 B1 | 1/2010 | Zhu et al. | | |
| 8,707,300 B2 | 4/2014 | Govindan et al. | | |
| 8,996,890 B2* | 3/2015 | Cox | ............... | G06F 1/3203 713/300 |
| 9,459,678 B2* | 10/2016 | Lathrop | ............ | G06F 1/3203 |
| 2005/0055590 A1* | 3/2005 | Farkas | ............ | G06F 1/206 713/320 |
| 2005/0160423 A1 | 7/2005 | Bantz et al. | | |
| 2006/0129675 A1* | 6/2006 | Zimmer | ............. | G06F 1/3209 709/225 |
| 2006/0195715 A1 | 8/2006 | Herington | | |
| 2006/0294238 A1 | 12/2006 | Naik et al. | | |
| 2008/0028409 A1 | 1/2008 | Cherkasova et al. | | |
| 2008/0163194 A1* | 7/2008 | Dias | ............... | G06F 9/5077 717/174 |
| 2008/0244215 A1 | 10/2008 | Flemming et al. | | |
| 2009/0006801 A1 | 1/2009 | Shultz et al. | | |
| 2009/0070771 A1* | 3/2009 | Yuyitung | ............ | G06Q 10/06 718/105 |
| 2009/0187775 A1* | 7/2009 | Ishikawa | ............ | G06F 1/3203 713/310 |
| 2009/0199177 A1 | 8/2009 | Edwards et al. | | |
| 2009/0241108 A1 | 9/2009 | Edwards et al. | | |
| 2009/0293022 A1* | 11/2009 | Fries | ............... | 716/2 |
| 2010/0153945 A1* | 6/2010 | Bansal | ............... | G06F 9/4881 718/1 |
| 2010/0191845 A1* | 7/2010 | Ginzton | ............. | G06F 9/4856 709/224 |
| 2010/0191854 A1 | 7/2010 | Isci et al. | | |
| 2010/0205395 A1 | 8/2010 | Srinivasan | | |
| 2010/0205602 A1 | 8/2010 | Zedlewski et al. | | |
| 2010/0241884 A1* | 9/2010 | Barsness | ............ | G06F 1/3203 713/322 |
| 2010/0268816 A1 | 10/2010 | Tarui et al. | | |
| 2010/0281482 A1* | 11/2010 | Pike et al. | ............ | 718/102 |
| 2011/0022812 A1* | 1/2011 | van der Linden | ..... | G06F 9/5077 711/163 |
| 2011/0072138 A1 | 3/2011 | Canturk et al. | | |
| 2011/0078303 A1* | 3/2011 | Li et al. | ............... | 709/224 |
| 2011/0078395 A1 | 3/2011 | Okada et al. | | |
| 2011/0131431 A1* | 6/2011 | Akers | ............... | G06F 9/5027 713/320 |
| 2011/0131571 A1* | 6/2011 | Heim | ............... | G06F 9/45558 718/1 |
| 2011/0213508 A1* | 9/2011 | Mandagere | ........ | G06F 1/3203 700/291 |
| 2011/0213997 A1* | 9/2011 | Kansal | ............... | G06F 1/3203 713/324 |
| 2011/0214123 A1* | 9/2011 | Lublin | ............... | G06F 9/5055 718/1 |
| 2011/0225299 A1* | 9/2011 | Nathuji et al. | ........... | 709/226 |
| 2011/0252248 A1* | 10/2011 | Cameron | ............ | G06Q 50/06 713/300 |
| 2011/0302578 A1 | 12/2011 | Isci et al. | | |
| 2012/0005505 A1* | 1/2012 | Tolia | ............... | G06F 1/206 713/320 |
| 2012/0005683 A1* | 1/2012 | Bower, III | ......... | G06F 9/5094 718/103 |

OTHER PUBLICATIONS

Tickoo, et al., "Modeling Virtual Machine Performance: Challenges and Approaches", Retrieved at << http://www.sigmetrics.org/sigmetrics/workshops/papers_hotmetrics/session3_1.pdf >>, ACM Sigmetrics Performance Evaluation Review, vol. 37, No. 3, Dec. 2009, 5 pages.

Nathuji, et al., "Q-Clouds: Managing Performance Interference Effects for QoS-Aware Clouds", Retrieved at << http://research.microsoft.com/pubs/118372/QClouds.pdf >>, European Conference on Computer Systems, Proceedings of the 5th European conference on Computer systems, Apr. 13-16, 2010, 14 pages.

Ebrahimi, et al., "Fairness via Source Throttling: A Configurable and High-Performance Fairness Substrate for Multi-Core Memory Systems", Retrieved at << http://www.ece.cmu.edu/~omutlu/pub/fst_asplos10.pdf >>, Architectural Support for Programming Languages and Operating Systems, Proceedings of the fifteenth edition of ASPLOS on Architectural support for programming languages and operating systems, Mar. 13-17, 2010, 12 pages.

Benevenuto, et al., "Understanding Virtualization Overhead to Optimize VM Mechanisms and Configurations", Retrieved at << http://www.dcc.ufmg.br/~fabricio/download/fabricio-xenconfig-100605 >>, 10 pages.

Non-Final Office Action dated Aug. 17, 2012 from U.S. Appl. No. 12/843,054, 21 pages.

Response filed Dec. 17, 2012 to the Non-Final Office Action dated Aug. 17, 2012 from U.S. Appl. No. 12/843,054, 14 pages.

Final Office Action dated Mar. 7, 2013 from U.S. Appl. No. 12/843,054, 17 pages.

Response filed Jun. 7, 2013 to the Final Office Action dated Mar. 7, 2013 from U.S. Appl. No. 12/843,054, 14 pages.

Non-Final Office Action dated Jun. 20, 2013 from U.S. Appl. No. 12/843,054, 19 pages.

Response filed Sep. 19, 2013 to the Non-Final Office Action dated Jun. 20, 2013 from U.S. Appl. No. 12/843,054, 15 pages.

Notice of Allowance and Examiner-Initiated Interview Summary dated Dec. 6, 2013 from U.S. Appl. No. 12/843,054, 16 pages.

* cited by examiner

WORKLOAD INTERFERENCE ESTIMATION AND PERFORMANCE OPTIMIZATION

CROSS-REFERENCE TO RELATED APPLICATIONS

This application is a continuation of co-pending Non-Provisional patent application Ser. No. 12/843,054, entitled "WORKLOAD INTERFERENCE ESTIMATION AND PERFORMANCE OPTIMIZATION", and filed Jul. 26, 2010.

BACKGROUND

Computing systems continue to evolve to facilitate increased performance when processing workloads. Virtualization is a technology that allows multiple virtual machines (workloads) to be created and executed on a single physical computer, yielding various advantages, including better utilization of hardware, and better isolation of multiple software applications running on the same computer. Virtualization partitions the resources of a physical computer among multiple virtual machines such that each virtual machine uses an allocated share of the resources.

However, certain resources are shared and not completely partitioned, or the partitioning is not strictly enforced by the current virtualization technology. This causes a problem in that the performance of a virtual machine changes depending on the level of utilization of the shared resource by other virtual machines. For instance, as a shared resource becomes more heavily utilized, a virtual machine may start receiving a lower share than what it gets when the resource is at low utilization. This phenomenon is often referred to as interference.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the estimation of interference among workloads (e.g., virtual machines) due to a shared resource (e.g., a shared cache of a computer processor), and optimization of a desired performance objective such as power or energy use in the presence of the interference. Estimation is to the extent of interference by characterizing the nature of shared resource usage and its effect on performance. Performance optimization is accomplished using metrics based on the above estimation, or alternatively, an explicit measurement of the interference effects.

The architecture employs methods to estimate interference among workloads sharing one or more physical resources. The estimation of interference yields the effect on the workload's performance with changes in availability of the shared resource or with combinations of other workloads sharing the same resource. Another method allocates workloads to one or more physical computers or allocates resources to workloads such that a desired performance objective is optimized. The nature of interference may be obtained using the above methods or explicitly measured on an actual system. The methods can include allocating workloads, but not all at the same time, and new workloads may be allocated on demand.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture facilitates the estimation of interference among workloads (e.g., virtual machines) due to a shared resource (e.g., a shared cache of a computer processor), and optimization of a desired performance objective such as power or energy use in the presence of the interference. Estimation is to the extent of interference by characterizing the nature of shared resource usage and its effect on performance. Performance optimization is accomplished using metrics based on the above estimation, or alternatively, an explicit measurement of the interference effects. Methods are employed to estimate interference on the workload's performance with changes in availability of the shared resource or with combinations of other workloads sharing the same resource and allocating workloads to one or more physical computers or resources to workloads such that a desired performance objective is optimized. The methods can include allocating workloads on demand.

When multiple workloads, such as virtual machines (VMs) run on the same computer and share a resource, the performance (work done per unit time, or time taken to finish a task) of each VM may change compared to the case when a single VM runs alone on a computer. The impact on performance is due to a change in allocation of the shared resource. The same effect is also observed in the case of processes or threads sharing the same computer. This change in performance is referred to as interference. For instance, when a VM runs alone on a machine, the lone VM may perform ten units of work per second. On the other hand, when a second VM is added to the same machine, even if the first VM has been allocated the same resources as before (e.g., a processor, memory space) and the second VM uses its own separate resources, the performance of the first VM may be reduced.

Consider now that the first VM is able to perform only eight units of work per unit time. The change from ten to eight units is caused by interference. Note that additional changes in performance may occur if some resource is taken away from one VM when additional VMs are created.

The description assumes resources allocated do not change; however, the disclosed architecture applies also to cases where a resource allocated does indeed change. In that case, the performance can be considered on a per-unit resource basis.

Following is a more detailed an example of interference. Consider a computer with two processor cores, 10 GB of random access memory (RAM) and 300 GB of disk space. Two VMs are created such that each VM is allocated one processor core, 4 GB of RAM, and 100 GB of disk space. In principle, each VM has its own share of resources and should not affect the other. However, a computer system has resources other than the processor cores, RAM, and disk that are also used by the VMs. For instance, a computer system has cache memory that is used to speed up access to the RAM memory. The cache memory stores recently used data items from RAM and the processor can access these from the cache much faster than from the RAM. In many computer systems, the cache memory (or some portion of it) is shared among all or some of the processor cores. Thus, even when the VMs run on assigned processor cores, the VMs both use the same cache memory. If one VM uses some space in the cache memory then the space available to the other VM is reduced.

For example, consider three VMs: A, B, and C, with the following hypothetical characteristics. VM A uses almost no data and performs mainly complex computations using only the processor core. VMs B and C use moderate amounts of data and this can be easily accommodated in the cache memory. When the data is all present in the cache memory, the VMs B and C perform much better than when the data has to be fetched from RAM.

If VMs A and B are placed on the same computer, since VM A uses no cache space, VM B performs well (e.g., VM A performs ten units of work per unit time and VM B also performs ten units of work per unit time, when co-located). Similar behavior is observed when VMs A and C are co-located on the same computer. However, when VMs B and C are co-located, both try to use the cache space. Suppose VM B gets 25% of the cache and C gets 75% of the cache (cache space used depends on various factors such as the cache management policies built into the processor, and cache is not necessarily shared equally). Suppose the reduced cache space availability causes VM B to perform five units of work per unit time (instead of ten) and VMC to perform eight units of work per unit time (instead of ten, when operating with full cache).

In the above example, even though in each case all VMs are allocated the requested one processor core, 4 GB of memory, and 100 GB of disk space, performance varies due to cache space sharing. This is an example of interference due to cache sharing.

It is noted that certain virtualization technologies may partition the cache separately to each VMs—this example is only using the cache as one instance of a shared resource. The kind of interference described in this example occurs as long as at least one resource used is shared among multiple VMs. Examples of such shared resources that are not usually partitioned by virtualization include: memory bandwidth, disk bandwidth, storage area network bandwidth, and dedicated accelerator chips.

The cache interference example above illustrates that VM performance depends on which VMs share the computer system. For a small number of VMs, one could measure the performance with interference. However, in practice, when a large number of VMs are to be placed on a large number of computer systems, measuring the performance degradation in each possible combination becomes very tedious. If there are n VMs and m computer systems, then there are C (n, m) possible combinations, where $$C(n,m)=n!/(m!(n-m)!)$$

where the exclamation symbol (!) refers to the factorial computation, and C(n, m) is called the combinatorial. It is known in common mathematics that the computation of the combinatorial is exponential in complexity, or stated in other words, the number of operations required to measure all possible combinations grows with a power n, such as $k^n$. Exponential methods are known to be very time consuming and not preferred in computer science.

The disclosed architecture estimates the interference effects using a polynomial number of operations. Polynomial methods refer to solutions where the number of operations involved in a small multiple of n, such as $k*n^2$. In addition, the measurement of interference with actual workloads may be slow since the workload must be run to completion for the effect to be measured reliably. On the other hand, in the disclosed method, faster measurements can be made using the disclosed control workloads.

The architecture utilizes a control VM (or workload), which is created to use the shared resource in a controlled manner. In the previous example, where the cache memory was the shared resource, a control VM is employed that uses cache space in a controlled manner. For example, a control VM is configured to use a specific fraction Y of the shared resource (where Y is a percentage), and is denoted VMC-Y (e.g., the control VM set to use 30% of the shared cache is denoted VMC-30).

The following steps can then be performed to estimate the interference. First, the control VMs with different levels of shared resource use are executed in pairs with different possible combinations such as VMC-0 and VMC-0, VMC-0 and VMC-10, . . . , to VMC-0 with VMC-100. Then, VMC-10 and VMC-0, VMC-10 and VMC-10, . . . , VMC-10 with VMC-100, and so on, to test all the possible permutations. It is noted that fewer or more levels than those shown here may be used if lower/higher resolution characterization is desired. This is a one-time step and the performance results are stored in a table after this step is executed.

Next, the VM for which interference characteristics are to be determined (the "test VM", denoted VMT) is executed on the computer system with each of the control VMs, VMC-0, VMC-10, VMC-20, . . . , VMC-100, one at a time. Performance is recorded in each case. The control VM that shows performance degradation most similar to the test VM is identified. For instance, if the test VM yields performance degradation approximately equal to VMC-40 when executed with each of VMC-0, VMC-10, VMC-20, . . . , VMC-100, then it is noted that the test VM behaves similar to control VMC-40. Note that it can be the cases where the test VM does not perform exactly like any of the VMC-levels. The Euclidean distance between the performance vectors is computed and the nearest vector is used. Distance metrics other than the Euclidean distance may also be employed. Additionally, it is noted that in many cases the measurement of performance for control VMs (VMC-10, ... VMC-100) in various combination is much faster than measuring interference among two actual test workloads, because these control workloads can be designed to be short tasks.

Next, the performance degradation (i.e., interference) is estimated when test VMs VMT A and VMT B are executed on the same computer. For example, consider that the comparison test in the above example performed for VMT A and VMT B yields the similar control VMs VMC-X and VMC-Y, respectively. Then, the table created above is consulted for the performance degradation when running VMC-X and VMC-Y together. This is an estimate of the interference when VMs VMT A and VMT B are run together.

Note that the interference characteristics may be different on different computer systems (e.g., such as systems with different cache sizes or cache management policies when the shares resource is cache memory). Moreover, the above technique may be applied to each computer system of interest. Additionally, the utilization of the shared resource in the above example can be measured simply in terms of different percentages or levels and control loads can be generated for one varying parameter (e.g., VMC-Y, where Y varies). For certain resources, utilization may be measured with more than one parameter, and control workloads may be generated for more than one varying parameter (e.g., VMC-Y1Y2, where both Y1 and Y2 vary). As an example, if the shared resource is processor cache, Y1 may represent the amount of cache space used, while Y2 represents the spatial distribution (spread across different locations).

There may be variations to the above technique which may be employed. The above method may be modified for cases where the behavior of a VM changes over time, or in different phases of operation over time. For example, consider that a VM performs a computation using cache space for the first ten seconds, and then performs a computation that uses almost no cache space for the next five seconds. This VM can be represented as a VM that behaves as a high cache user for 10/(10+5) fraction of the time and low cache user for 5/(10+5) fraction of the time.

Similarly, VMs with more than two types of behaviors can be represented using appropriate fractions and appropriate cache usage levels during those fractions of time. The above method is then used to characterize each fraction of the time and the interference behavior is estimated using all such behaviors.

The above method is described for two VMs for the sake of simplicity. However, it is not to be construed as limiting in any way, since the method can be applied to more than two VMs sharing the same computer, as well.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
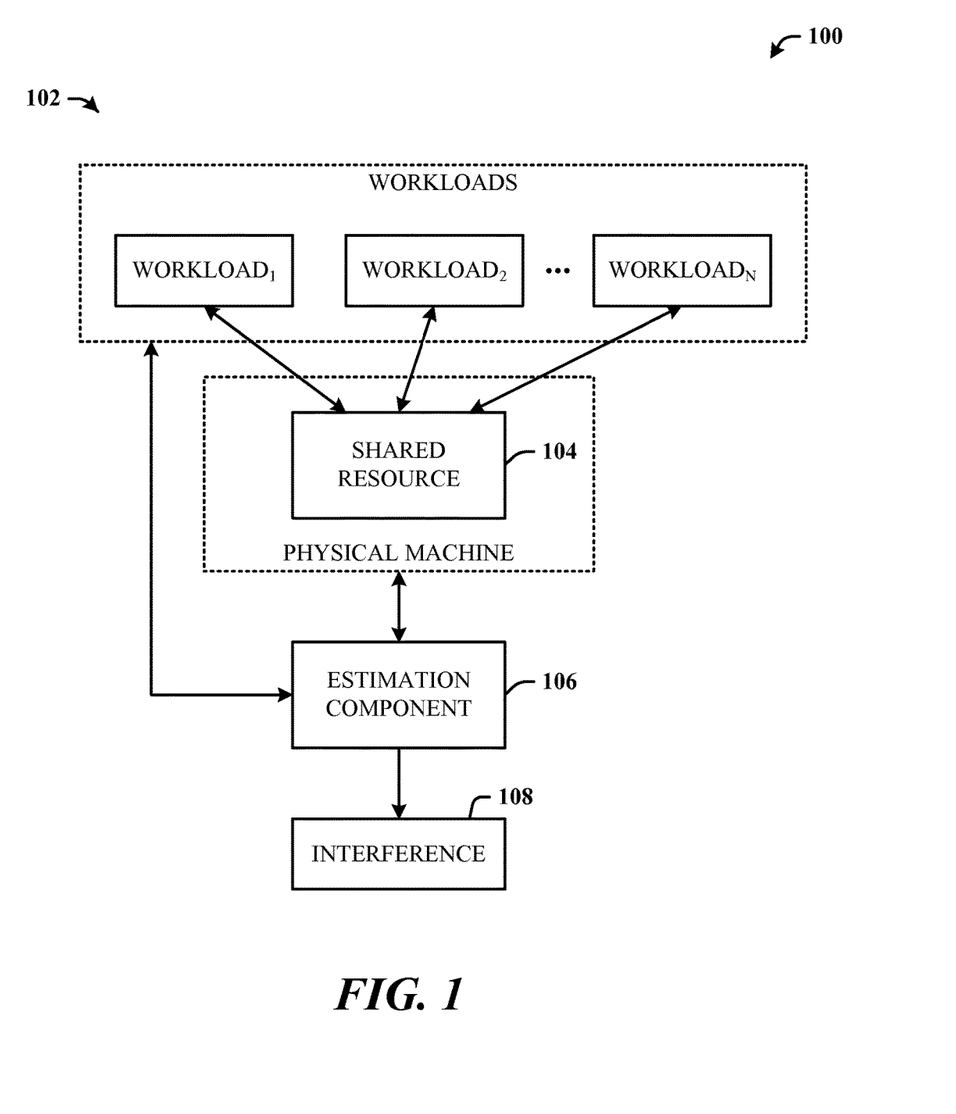
FIG. 1 illustrates workload management system in accordance with the disclosed architecture.

FIG. 1 illustrates workload management system 100 in accordance with the disclosed architecture. The system 100 include multiple workloads 102 (e.g., virtual machines) each having an initial apportionment of a shared physical resource 104 (e.g., a processor cache memory), and an estimation component 106 that estimates interference 108 among workloads when the workloads are executed in a specific workload combination. The estimation component 106 includes a data source (e.g., lookup table) of control workload configurations and associated interference values against which test workloads are compared to determine the interference 108. The estimation component's 106 estimation of the interference 108 yields an effect on workload performance with changes in availability of the shared resource 104 or with combinations of other workloads 102 sharing the shared resource 104.

Figure 2:
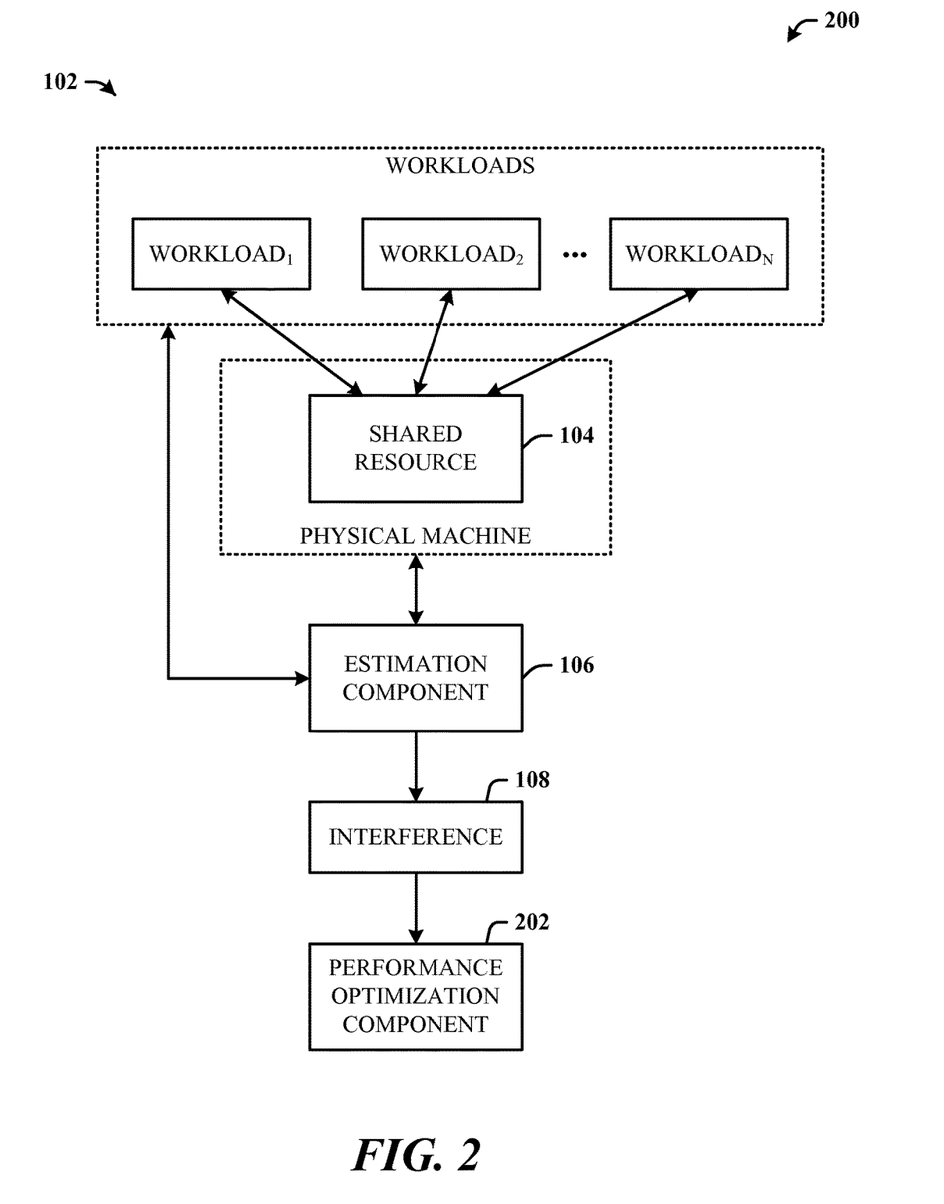
FIG. 2 illustrates an alternative embodiment of a system that estimates interference, and then uses the interference for performance optimization.

FIG. 2 illustrates an alternative embodiment of a system 200 that estimates interference, and then uses the interference for performance optimization. The system 200 applies a performance optimization component 202 to the system 100 of FIG. 1, which optimizes performance of a workload or multiple workloads based on the interference 108 (e.g., which may potentially change over time). The performance optimization component 202 assigns one or more workloads to a single physical machine 104 or among multiple physical machines to optimize workload performance. The performance optimization component 202 optimizes performance based on at least one of changes in demands on the shared resource by a workload, one or more metrics-of-interest, or changes in a number of the workloads accessing the shared resource. The features and capabilities of the estimation and performance optimization are as described in detail herein.

Figure 3:
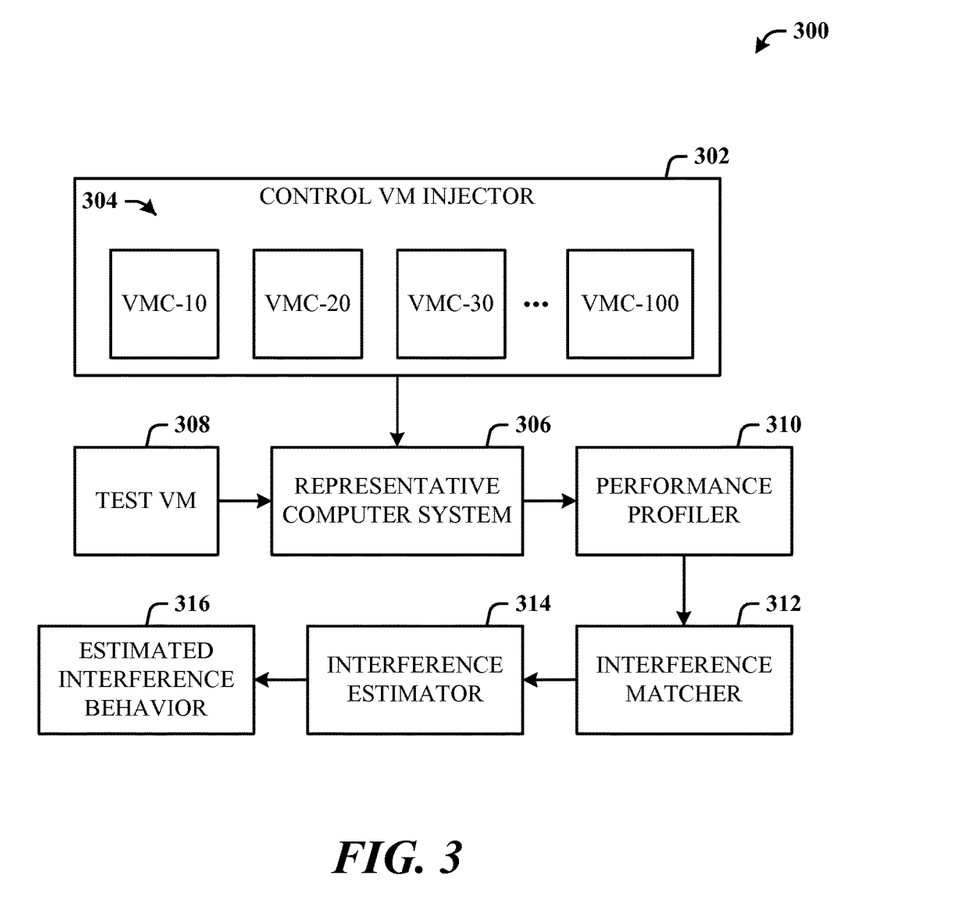
FIG. 3 illustrates an interference estimation system.

FIG. 3 illustrates an interference estimation system 300. The system 300 includes a control VM injector 302 which can run one or more versions 304 of the control VM at different resource usage levels such as VMC-10, VMC-20, etc. A representative computer system 306 is provided that represents the computer system configuration (with its specifications of resources present) for which the interference is to be estimated. A Test VM 308 denotes the VM for which the performance characteristics are being generated. Two or more VMs are tested before interference among the VMs can be predicted. A performance profiler 310 records the performance of each VM, including the test VM and control VMs that are run on the representative computer system 306. An interference matcher 312 identifies the control VM level that behaves most closely to the Test VM 308. An interference estimator 314 uses the identified control VM levels for two or more test VMs to estimate the associated interference behavior 316.

In this system 300, each of the n test VMs is run simultaneously with a fixed number of control VM levels (e.g., if the number of levels is k, then each VM is executed k times). For n VMs, k*n operations are performed, and hence, this is a polynomial time method.

Figure 4:
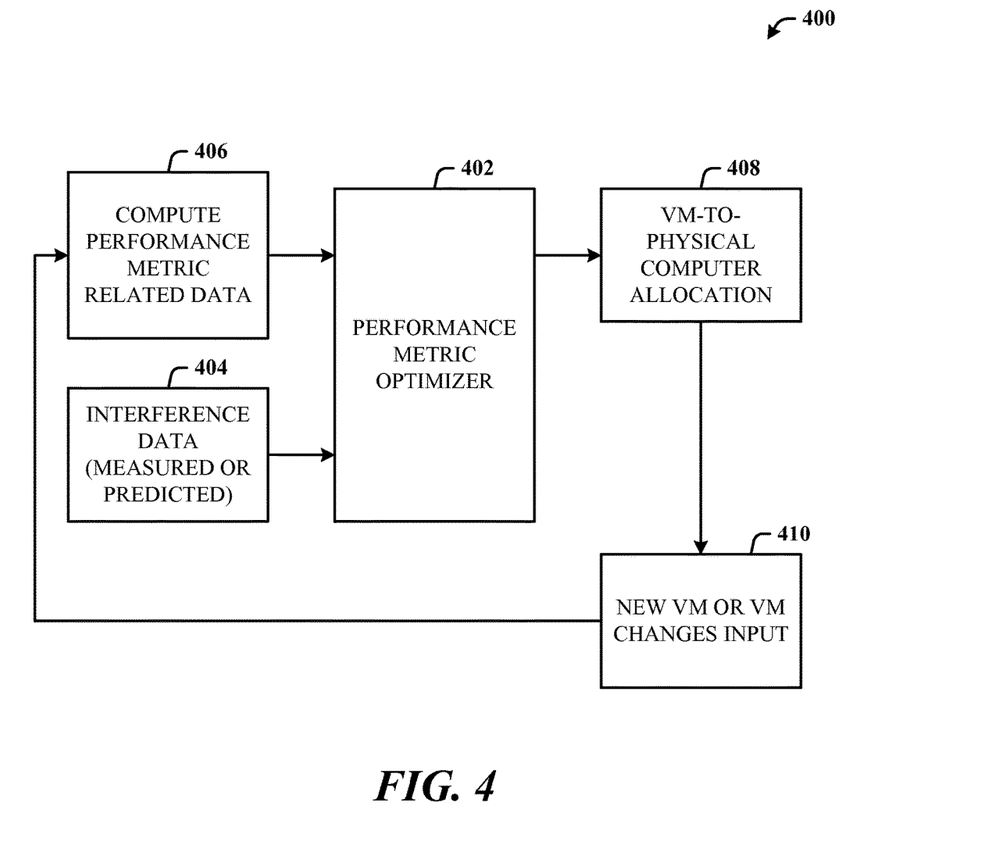
FIG. 4 illustrates a performance optimization system.

FIG. 4 illustrates a performance optimization system 400. When two or more VMs share resources (e.g., a single physical computer, a shared storage device, a shared network connection, etc.) the contention for the shared resource has an impact on the performance of the virtual machine. The interference can be estimated using the methods previously described, or alternatively, the interference can be measured by actually executing the VMs under various conditions that are of interest to the VM usage.

In an example, there are n virtual machines that share one or more resources, or even an entire physical machine. Assume that the interference in performance that occurs by placing these virtual machines in all relevant combinations (relevant combinations may be all possible combinations or a subset of the possible combinations that are allowed based on user policies) is known. For instance, where n=2, two virtual machines (VM1 and VM2) are created on single physical machine with two processors, 10 GB of memory, and 300 GB of disk storage. Each VM utilizes a minimum of one processor, 4 GB of memory, and 100 GB of disk storage. In this case, one possible combination of allocating VM1 and VM2 is to give one processor to VM1, the other processor to VM2, and then allocate to VM1 and VM2 the requisite memory and disk storage.

If the processor, memory, and disk storage spaces are partitioned (e.g., equally, as required, etc.), then there is no interference in usage. However, if there are shared resources on the physical machine, such as the processor cache that is not partitioned between VM1 and VM2, when VM1 is not using the cache, VM2 achieves high performance; however, as VM1 begins to use the cache, VM2 performance degrades in proportion to the cache usage of VM1.

At least two methods are provided to optimize performance in the presence of interference. In this description of the methods, performance is measured in terms of energy consumed per unit work done, with the optimization objective to minimize the energy consumption of the total work done by all VMs. However, other performance objectives such as the rate at which work is done, may also be used. The disclosed methods determine how much of each resource is needed and which VM should share resources and with which other VMs. In this example, the resource is measured in terms of number of physical machines required and allocation is described in terms of which VMs are placed together on a single physical machine. However, the method may be applied to cases where only certain resources such as a storage device is shared and the choice of VMs that share that storage device is determined for optimization.

Consider an example where the total energy usage is measured as the energy used by all physical machines used by the n VMs for the durations the VMs are powered to finish work, and that all machines start at the same time, but may finish at different times. A physical machine stays powered on if any one or more VMs allocated to it are still not finished. For this example, consider the durations where all computers are powered on and measure the work done per unit energy spent as the performance objective.

To describe the performance optimization, the energy consumption and performance in this scenario is first described. When a physical machine is powered on, but no VM is using the physical machine, the machine uses a certain amount of power (referred to the idle power). When a VM is allocated to the machine and the VM starts using certain resources, the power usage of the machine increases. For instance, if the VM uses the processor, the power consumption as an example, may increase linearly with processor utilization. Let the idle energy used be denoted by rate of energy use per unit time (also known as power P0). The additional power used when VM1 is running alone on the computer is denoted P1, and VM1 is able to finish its work at rate W1 (measured in units of work done, e.g., transactions processed per unit time, or queries served per unit time). When VM1 and VM2 are running simultaneously, the power used is P0+P12 and VM1's rate of work done is W12. When VM2 runs alone, the computer uses power P0+P2 and VM2 finishes work at rate W2. Running simultaneously with VM1, the work done by VM2 is at rate W21 (power used by the computer is P0+P12). Let n=2, and only two VMs are considered (however, the method applies to any number of VMs).

The goal of the optimization is to minimize the energy used for finishing all the work. There are various possible allocations of VMs to physical machines. Assuming the work is divisible and multiple copies of a VM can be run to finish portions of the work in parallel. Then, at least the following options exist:

1. Run VM1 and VM2 on one physical machine. Power used: P0+P12. Work is done at rates W12 and W21 by VM1 and VM2, respectively. The performance metric, work done per unit energy is (W12+W21)/(P0+P12).
2. Run VM1 on one computer and VM2 on another computer. Power used is P0+P1+P0+P2. Work done is at rate W1+W2. The performance metric, work done per unit energy is (W1+W2)/(2P0+P1+P2).
3. Run multiple copies c1 of VM1 on C1 computers, and copies c2 of VM2 on C2 computers, where c1 and c2 are positive integers. Power used is c1(P0+P1)+c2(P0+P2). Work done is at rate c1W1+c2W2. Performance= (c1W1+c2W2)/(c1P0+c1P1+c2P0+c2P2).

Additional combinations, where some computers run VM1 and VM2 concurrently, and some computers run them separately, may also be considered. Additionally, in the third option above and the additional possible combinations, the total number of machines (such as c1+c2 in option three) may be limited to a specific number and hence only certain values may be considered allowed.

Note that the performance metric can be computed by actually measuring the power used and work done, or by using the interference estimation methods described earlier that allow estimating W1, W2, W12, W21, etc., without actually running the VMs.

The first method to optimize performance selects the option among the above feasible options that yields the maximum performance, such as maximum work done per unit energy. Known methods for maximization may be employed for this purpose. As proof of feasibility, consider the maximization method that enumerates the performance metric for each of the possible options listed above and then selects the option that yields the maximum value for the performance metric. However, more efficient methods to determine the maximum value, including deterministic methods such as linear programming, or randomized methods such as simulated annealing may also be employed. These alternatives to compute the maximum become increasingly attractive when the number of VMs and physical computers is large.

Once the correct option is determined, the VMs are placed on the appropriate number of computers. For instance, consider that a maximum of two physical computers are available. Let the power consumptions be as follows: P0=100 W (watts), P1=10 W, P2=10 W, and P12=20 W.

The work done with interference effects is as follows: W1=10 tps, W2=10 tps, W12=8 tps, W21=8 tps (where tps is transactions/second, a unit of measuring work done). Then, using option 1 above where both VMs are run on the same computer, yields performance=(8+8)/(100+20) =0.1333, while option 2 yields performance=(10+10)/(200+ 10+10)=0.0909. Additional options include running two computers, each with both VM1 and VM2 running simultaneously, yielding performance=(8+8+8+8)/(100+20+100+ 20)=0.1333. Thus, in this example, it can be observed that the option of running both VMs on one machine yields the better performance.

More machines may be used to increase the rate of work done but that does not improve work done per unit energy. As an alternative, consider another example where, again, the number of computers available is two but the computer technology is different, yielding different power numbers: P0=10 W, P1=100, P2=100, and P12=200. Let the work numbers (in tps) be the same as above: W1=10, W2=10, W12=8, and W21=8. Then, option 1 yields (8+8)/(10+200) =0.0762, and option 2 yields (10+10)/(2*10+100+100) =0.0909. Here, running VM1 on one computer and VM2 on another computer is the better technique. Note that in the second example, the idle power is small, and hence, the performance reduction due to running the VMs on the same computer is not worthwhile, while in the first example the idle power P0 was large, and hence, using one computer to run both VMs was beneficial.

The first method assumes that VMs to be allocated are known beforehand and also the resource usage patterns of all VMs are known upfront. However, in some cases, the VMs may not all be known upfront, but may have to be accommodated as and when the VMs are activated on the system. This is often the case for cloud computing environments where different customers submit VMs to be run at different times. Additionally, an existing VM may change its workload pattern and hence, its values of power and work per unit time may change over time. This happens, for instance, when the work done by a VM may depend on user loads and more users may be present at certain times of the day.

The second method presents a solution to optimize the performance metric of interest in such scenarios. The second method includes the following steps:

1. The resource usage of a VM is measured (or otherwise estimated) along key resource dimensions (e.g., processor usage, storage usage, and memory usage of a VM may be characterized).
2. The interference (performance in terms of work done) when the VM is collocated with various other VMs, is measured (or estimated).
3. Currently known VMs are placed such that an acceptable value of the desired performance metric (e.g., work per unit energy) is obtained, but not all available computers are used. It is desired to leave as many computers unused as possible. The acceptable value that is attempted to be achieved may be set based on the average achieved over past several attempts, or the one that is expected to be achieved with a typical mix of VMs that are likely to be added over time.
4. When a new VM arrives for execution (or an existing VM changes characteristics), all other VMs are left unchanged and the new (or changed) VM is allocated to the existing computers such that the overall performance metric stays high. For example, the new VM may be placed on a computer where the other VMs will see a lower effect in W values due to placement of this VM. If no placement of the new (or changed) VM allows achieving the expected performance value, additional computers may be powered on or a placement of the new and (some of) existing VMs may be attempted again.

In this manner, new VMs can be placed on the computers as and when they arrive.

The above methods have been described in the context of virtualization technology. However, note that multiple applications or workloads may be executed on the same computer even without virtualization, such as using multiple processes or multiple threads on a computer. The techniques to estimate performance interference and determine appropriate allocations to optimize performance apply also to such scenarios.

Returning to FIG. 4, a performance metric optimizer 402 (as part of the performance optimizer component 202) receives as input interference data 404. In this description, the interference data 404 is assumed to be known. The performance metric optimizer 402 also receives other performance metric-related data such as power consumption of each VM, as computed via a performance metric related data block 406. The performance metric optimizer 402 implements a method described above and/or associated method variations for allocating VMs to physical machines and the addition of new VMs over time. A VM-to-physical computer allocation block 408 represents the currently computed VM-to-computer assignment. A new VM or VM changes input block 410 detects when new VMs are requested, or the behavior of an existing VM has changed. The input block 410 sends the relevant new/changed VMs to the performance metrics related data block 406 for characterization, and this triggers the performance metric optimizer 402 to reallocate resources needed.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
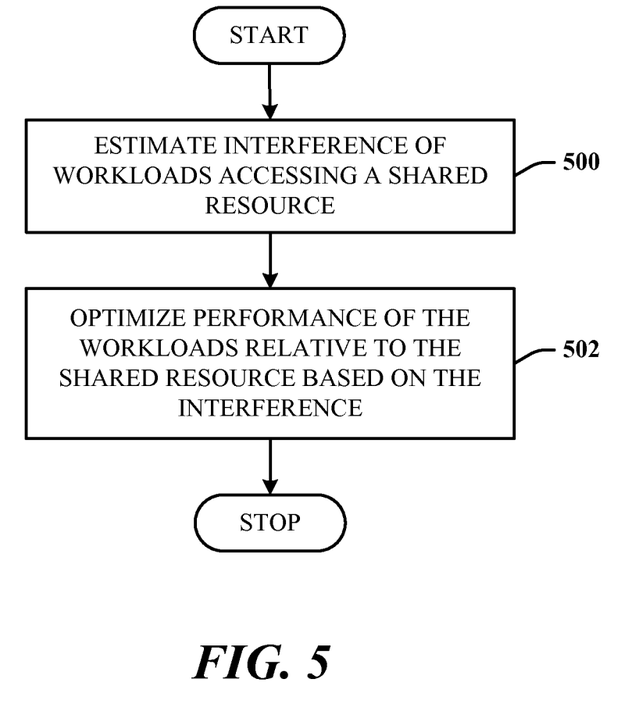
FIG. 5 illustrates a workload management method in accordance with the disclosed architecture.

FIG. 5 illustrates a computer-implemented workload management method in accordance with the disclosed architecture. At 500, interference of workloads accessing a shared resource is estimated. At 502, performance of the workloads relative to the shared resource is optimized based on the interference.

Figure 6:
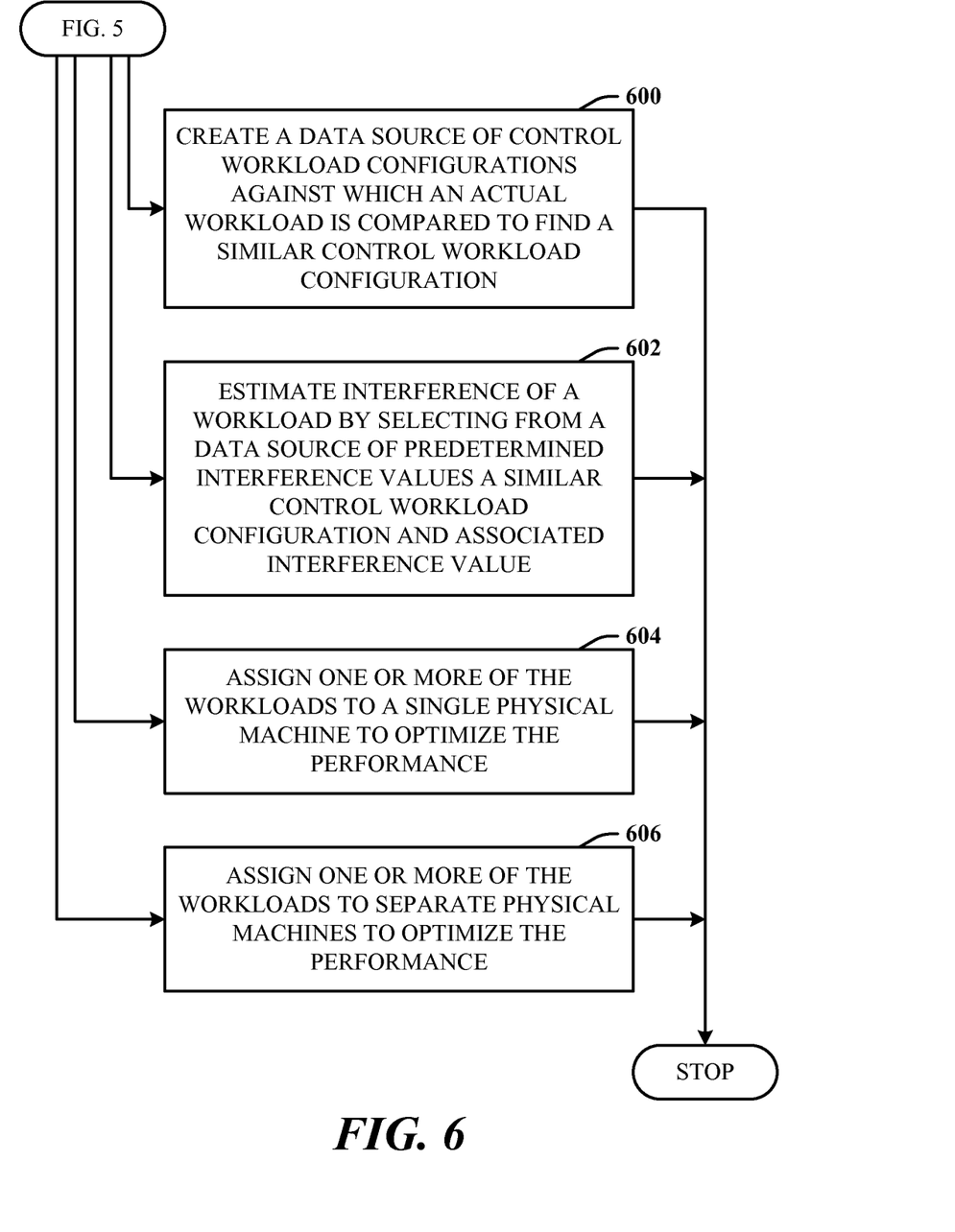
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, a data source of control workload configurations against which an actual workload is compared is created to find a similar control workload configuration. At 602, the interference of a workload is estimated by selecting from a data source of predetermined interference values a similar control workload configuration and associated interference value. The workloads are virtual machines sharing the shared resource, and the shared resource is a processor cache. At 604, one or more of the workloads are assigned to a single physical machine to optimize the performance. At 606, one or more of the workloads are assigned to separate physical machines to optimize the performance.

Figure 7:
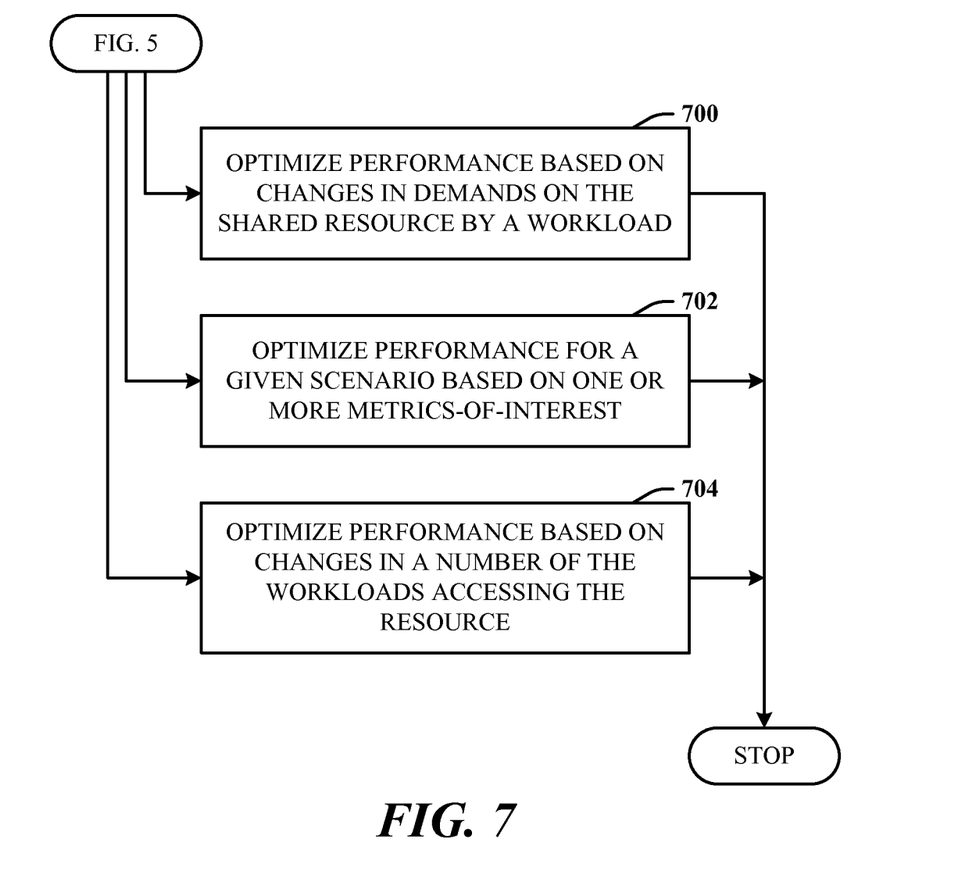
FIG. 7 illustrates further aspects of the method of FIG. 5.

FIG. 7 illustrates further aspects of the method of FIG. 5. Note that the arrowing indicates that each block represents a step that can be included, separately or in combination with other blocks, as additional aspects of the method represented by the flow chart of FIG. 5. At 700, the performance is optimized based on changes in demands on the shared resource by a workload. At 702, the performance is optimized for a given scenario based on one or more metrics-of-interest. At 704, the performance is optimized based on changes in a number of the workloads accessing the resource.

Figure 8:
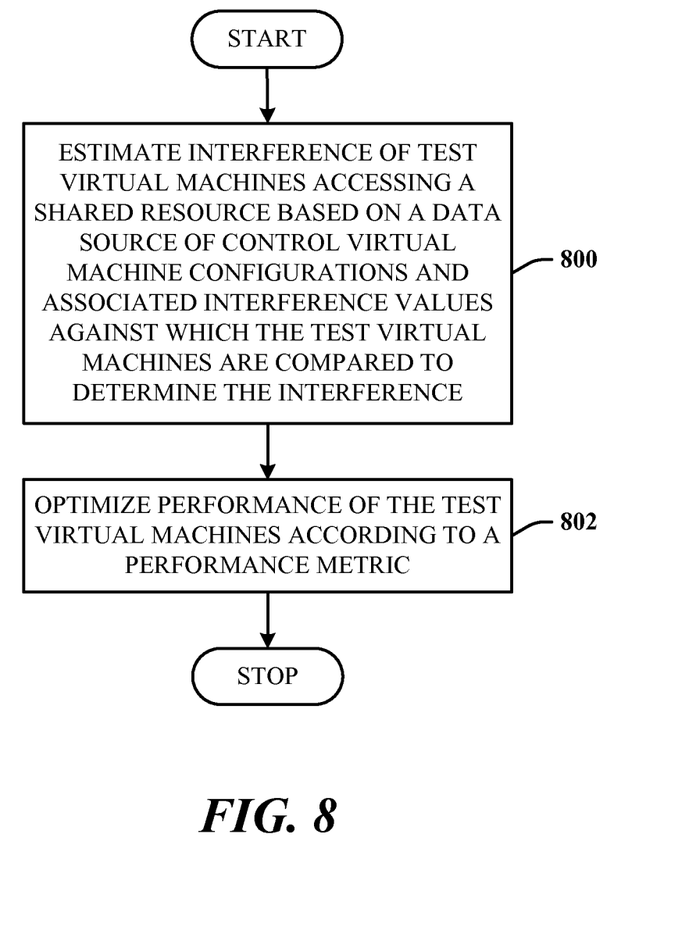
FIG. 8 illustrates a workload management method in accordance with the disclosed architecture.

FIG. 8 illustrates a computer-implemented workload management method in accordance with the disclosed architecture. At 800, interference of test virtual machines accessing a shared resource is estimated based on a data source of control virtual machine configurations and associated interference values against which the test virtual machines are compared to determine the interference. At 802, performance of the test virtual machines is optimized according to a performance metric.

Figure 9:
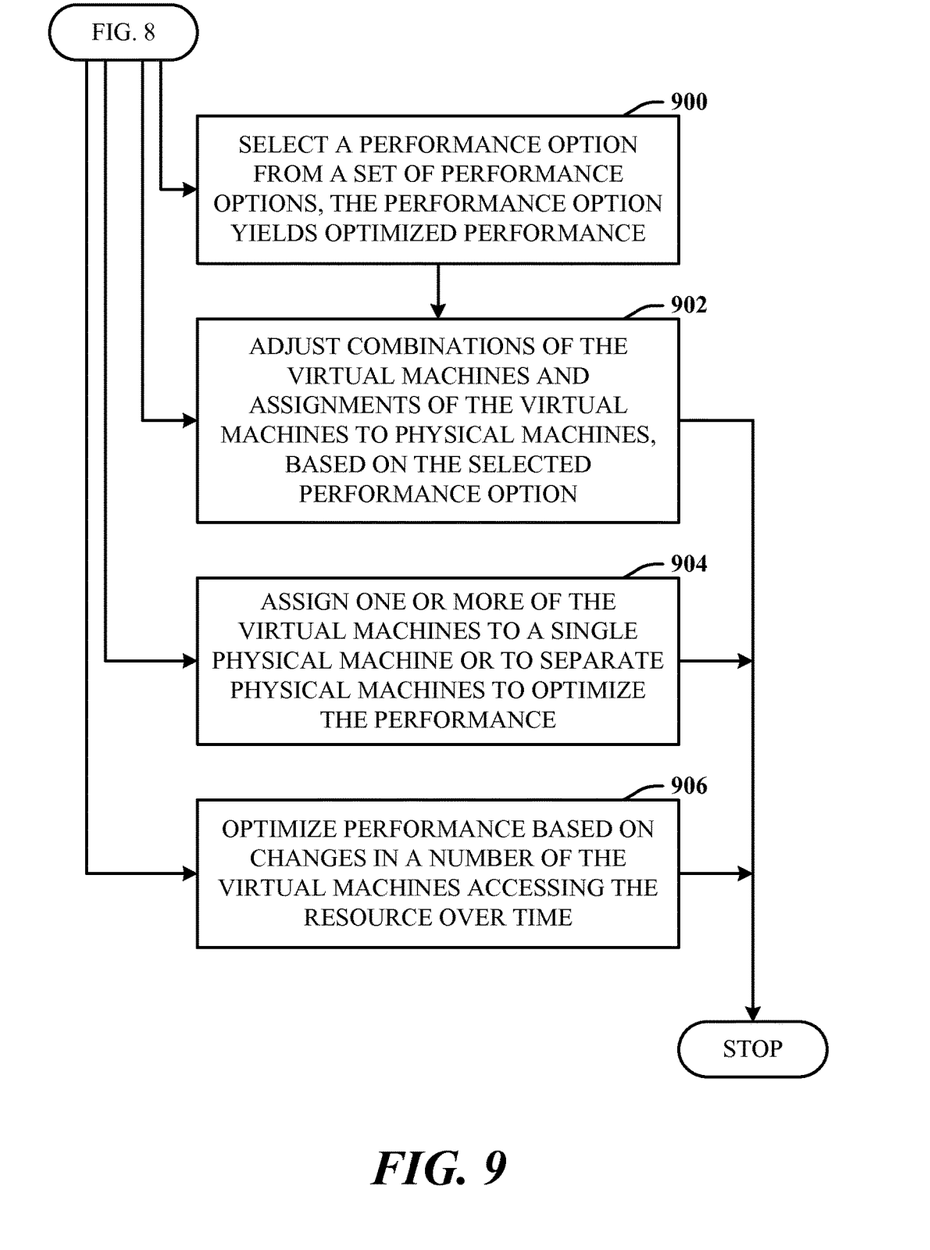
FIG. 9 illustrates further aspects of the method of FIG. 8.

FIG. 9 illustrates further aspects of the method of FIG. 8. Note that the arrowing indicates that each block represents a step that can be included, separately or in combination with other blocks, as additional aspects of the method represented by the flow chart of FIG. 8. At 900, a performance option is selected from a set of performance options. The performance option yields optimized performance. At 902, combinations of the virtual machines and assignments of the virtual machines to physical machines are adjusted, based on the selected performance option. At 904, one or more of the virtual machines are assigned to a single physical machine or to separate physical machines to optimize the performance. At 906, the performance is optimized based on changes in a number of the virtual machines accessing the resource over time.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
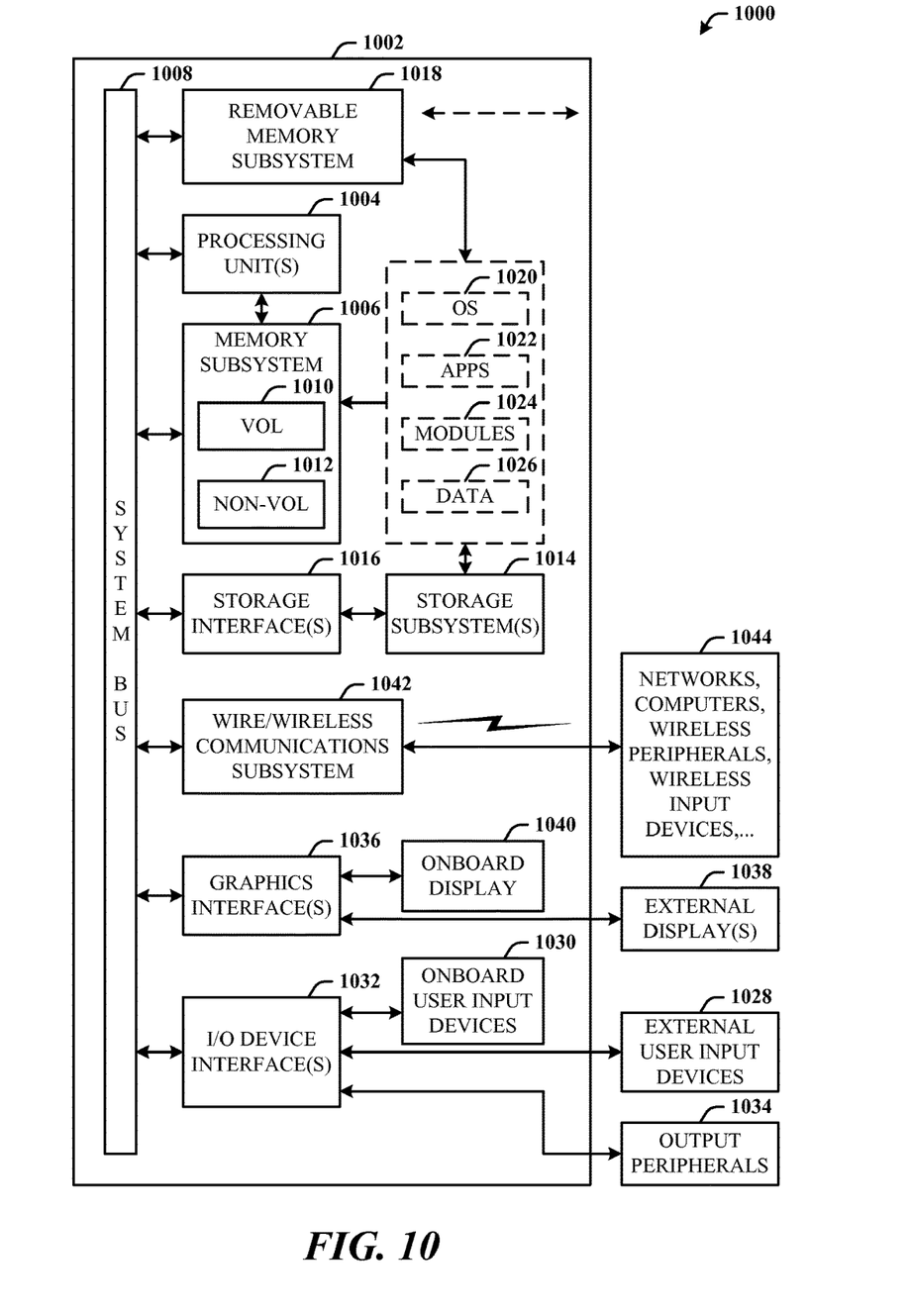
FIG. 10 illustrates a block diagram of a computing system that executes workload management in accordance with the disclosed architecture.

Referring now to FIG. 10, there is illustrated a block diagram of a computing system 1000 that executes workload management in accordance with the disclosed architecture. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The one or more application programs 1022, other program modules 1024, and program data 1026 can include the entities and components of the system 100 of FIG. 1, the entities and components of the system 200 of FIG. 2, the entities and flow of the system 300 of FIG. 3 and system 400 of FIG. 4, and the methods represented by the flowcharts of FIGS. 5-9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a hardware processor; and
   a hardware memory storing instructions which, when executed by the hardware processor, cause the hardware processor to:
   access a data source of control workload configurations, the data source providing interference values reflecting interference with respect to a shared physical resource when individual control workloads execute concurrently and use the shared physical resource;
   identify different test workloads for execution using the shared physical resource;
   perform executions of the different test workloads concurrently with the individual control workloads while sharing the shared physical resource;
   based at least on the executions, identify respective matching control workloads for the different test workloads, the matching control workloads exhibiting relatively similar performance degradation to respective test workloads during the executions;
   using the data source of control workload configurations and the matching control workloads, estimate energy usage impact of interference when the different test workloads that use the shared physical resource are executed in specific workload configurations; and
   adjust assignments of the different test workloads to one or more physical machines that use the shared physical resource based at least on the estimated energy usage impact of the interference.

2. The system of claim 1, wherein the instructions, when executed by the hardware processor, cause the hardware processor to:
   compare performance degradation of individual test workload configurations against individual control workload configurations to determine the estimated energy usage impact of the interference.

3. The system of claim 1, wherein the instructions, when executed by the hardware processor, cause the hardware processor to:
adjust the assignments by causing an individual test workload executing on a first physical machine to execute on a second physical machine.

4. The system of claim 1, wherein the instructions, when executed by the hardware processor, cause the hardware processor to:
adjust the assignments by causing two test workloads executing on different physical machines to execute on the same physical machine.

5. The system of claim 1, wherein the instructions, when executed by the hardware processor, cause the hardware processor to:
adjust the assignments by causing multiple copies of an individual test workload to execute on two or more physical machines.

6. The system of claim 1, wherein the instructions, when executed by the hardware processor, cause the hardware processor to:
create the data source of control workload configurations; and
optimize the assignments based at least on the estimated energy usage impact.

7. The system of claim 1, wherein the shared physical resource is a processor cache.

8. A method executed by a processor, the method comprising:
accessing a data source that provides control interference values reflecting interference with respect to a shared resource when different control workload configurations of concurrently-executing control workloads use the shared resource;
identifying different actual workloads for execution using the shared resource;
executing the different actual workloads concurrently with different control workloads while sharing the shared resource;
based at least on the executing, identifying respective matching control workloads for the different actual workloads that show relatively similar performance degradation;
estimating actual interference values for different actual workload configurations by identifying corresponding control configurations in the data source; and
adjusting assignments of the different actual workloads to different physical machines having instances of the shared resource based at least on the estimated actual interference values.

9. The method of claim 8, the adjusting being performed according to a performance metric reflecting rates at which individual actual workloads in the different actual workload configurations complete units of work in a given time.

10. The method of claim 8, further comprising:
estimating an individual actual interference value of an individual actual workload configuration by identifying, in the data source, a particular control interference value for a particular control workload configuration that is similar to the individual actual workload configuration; and
using the particular control interference value for the particular control workload configuration to determine an estimated interference of the individual actual workload configuration.

11. The method of claim 8, wherein the different actual workloads are different virtual machines sharing the shared resource, and the shared resource is a processor cache.

12. The method of claim 8, further comprising assigning one or more of the different actual workloads to a single physical machine to improve performance when executing the different actual workloads.

13. The method of claim 8, further comprising assigning individual actual workloads to separate physical machines to improve performance when executing the different actual workloads.

14. The method of claim 8, further comprising optimizing performance when executing the different actual workloads, the optimizing being based at least on changes in demands on the shared resource by an individual actual workload.

15. The method of claim 8, wherein each of the different control workloads is configured to use a specified level of the shared resource.

16. The method of claim 8, further comprising optimizing performance when executing the different actual workloads, the optimizing being based at least on changes in a number of actual workloads accessing the shared resource.

17. A computer-implemented workload management method executed by a processor, the method comprising:
executing different test virtual machines concurrently with control virtual machines;
based at least on the executing, identifying, for the different test virtual machines, respective matching control virtual machines that exhibit similar interference with respect to a shared resource;
using the matching control virtual machines to estimate interference of different test virtual machine configurations by accessing a data source of control virtual machine configurations and associated interference values; and
based at least on estimated interference, adjusting assignments of the different test virtual machines to different physical machines according to a performance metric.

18. The method of claim 17, the performance metric reflecting estimated work done per unit of energy by the different test virtual machines for different potential assignments to the different physical machines.

19. The method of claim 17, wherein the adjusting the assignments comprises optimizing the performance metric.

20. The method of claim 17, the shared resource being a shared processor cache, the control virtual machines being configured to use the shared processor cache at specified levels of cache usage.

* * * * *